United States Patent Office 3,309,408
Patented Mar. 14, 1967

3,309,408
PREPARATION OF PHOSPHINE OXIDE
COMPOUNDS
Kurt Moedritzer, Webster Groves, Mo., assignor to
Monsanto Company, a corporation of Delaware
No Drawing. Filed May 23, 1963, Ser. No. 282,596
12 Claims. (Cl. 260—606.5)

The present invention relates to the preparation of phosphine oxide compounds and, more particularly, to the preparation of tertiary phosphine oxide compounds, especially to the unsymmetrical aliphatic tertiary phosphine oxide compounds.

In the preparation of phosphine oxides by the rearrangement or isomerization of phosphinites to the corresponding phosphine oxides, commonly referred to as the Michaelis-Arbuzov isomerization, the yields are relatively high when the "reactive" phosphinites, that is, those containing less than about 4 carbon atoms in the ester group, such as methyl, ethyl, allyl esters and the like, and those containing the benzyl ester group undergo the isomerization. However, it has been found that this isomerization method results, in general, in markedly reduced yields for the other phosphinites capable of undergoing the isomerization and, in general, the yields progressively decrease as the number of carbon atoms in the ester group undergoing the isomerization progressively increase. As can be appreciated, a method for improving the yields of the desired phosphine oxides which are produced in relatively low yields in the aforementioned isomerization of phosphinites would represent a significant advancement in this art.

Therefore, it is an object of this invention to provide an improved method of preparing phosphine oxides.

It is a further object of this invention to provide an improved method for preparing tertiary phosphine oxides.

It is a further object of this invention to provide an improved method for preparing unsymmetrical aliphatic tertiary phosphine oxides.

Another object of this invention is to provide a method for improving the yields of the desired phosphine oxides normally produced in relatively low yields in the aforementioned isomerization reaction of phosphinites.

A still further object of this invention is to provide an improved method for preparing unsymmetrical aliphatic tertiary phosphine oxides in good yields.

These and other objects will become more apparent from a reading of the following detailed description.

It has now been found that tertiary phosphine oxides can be prepared by the isomerization or rearrangement of phosphinites to the corresponding phosphine oxides in improved yields when the isomerization is conducted under substantially non-oxidizing conditions.

The isomerization can be represented by the following equation:

(1) 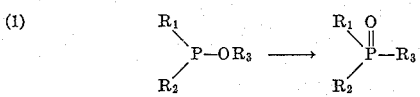

wherein $R_1$ and $R_2$ represent aliphatic groups, aryl groups, alkaryl groups, aralkyl groups, alicyclic groups and heterocyclic groups, and $R_3$ represents aliphatic groups and alicyclic groups containing 5 or more carbon atoms and alkaryl groups containing 8 or more carbon atoms. In addition, all of the foregoing groups may contain one or more of the following substituents: hydroxy groups, amino groups, amide groups, ether groups, ester groups, carboxy groups, sulfonyl groups, sulfo groups and nitro groups.

When the symbols $R_1$, $R_2$ and $R_3$ represent groups containing carbon chains, such as aliphatic groups, or groups containing alkyl moieties, i.e., alkaryl groups, such carbon chains may be a straight chain structure or branched chain structure. When the symbols $R_1$, $R_2$ and $R_3$ represent groups containing unsaturated carbon chains, these chains may contain both double bonds and triple bonds as well as contain more than 1 of such bonds although it is preferred that when such symbols represent unsaturated carbon chains they are ethylenically unsaturated. When the symbols $R_1$, $R_2$ and $R_3$ represent groups containing aromatic carbon rings such as aryl groups or groups containing aryl moieties, i.e., alkaryl groups, such carbon rings are preferably mono- or di-ring groups, although multi-ring groups containing more than 2 rings, i.e., 3 to 5 or even more can be utilized in the practice of the present invention. Although the groups represented by $R_1$, $R_2$ and $R_3$ may be like or unlike, it is preferred that each of the groups contain not over about 20 carbon atoms, and this is especially preferred for the groups represented by $R_3$. In addition, when groups represented by $R_3$ contain substituents, it is preferred that the substituents not be on the carbon atom attached to the O atom in the P—O—$R_3$ bond linkage of the phosphinite.

In general, the isomerization may be carried out in the conventional manner for this reaction with the use of heat alone with usually temperatures between about 100° and 200° C. being sufficient to initiate the isomerization or with the use of heat and a halide catalyst, including organic as well as inorganic halide compounds, as described in Kosolapoff, Organo-Phosphorus Compounds, John Wiley and Sons, New York, N.Y. (1950), pages 102 and 103 and pages 121 through 123. When using an organo halide catalyst, the organo radical of the halide is the same organo radical of the phosphinite which undergoes the isomerization. In general, any amount of the halide catalyst may be used, however, for economic and other reasons the halide catalyst is preferably used in catalytic amounts, that is, amounts less than about 10% by weight of the phosphinite. Generally speaking, the use of the catalyst with heating is preferred in that the initiating temperature of the isomerization may be decreased as well as in some cases the rate of reaction increased.

By the term "non-oxidizing conditions" as used herein is meant conditions which substantially exclude oxygen, i.e., uncombined oxygen, from the reaction zone. There are numerous and various methods by which the isomerization reaction can be carried out under non-oxidizing conditions which include carrying out the isomerization under a non-oxidizing atmosphere by using gases such as nitrogen, carbon dioxide, and the inert gases, such as, neon, argon and the like, including mixtures thereof. In addition, the reaction can be carried out in a sealed tube or in an autoclave under high vacuum from which air has been excluded. If desired, the reaction may be carried out in a reaction vessel under a layer of lighter density, immiscible solvent which is capable of excluding oxygen from the reaction zone. Although there are other methods which may be satisfactorily used, the foregoing are set-forth for illustrative purposes only.

As previously mentioned, the isomerization of phosphinites can be readily carried out when the "reactive" phosphinites undergo the isomerization and give relatively high yields. However, for other phosphinites capable of undergoing the isomerization reaction, the yields, in general, produced by the isomerization progressively and markedly decrease as the number of carbon atoms in the ester group undergoing the isomerization progressively increase. By way of example, the following table is presented representing the percent yields by weight based on phosphinites isomerized according to the equation $R_2P(OR') \rightarrow R_2R'PO$ with R representing methyl groups under normal conditions, i.e., in air, and under non-oxidizing conditions, i.e., excluding air.

TABLE 1

| R' | Normal conditions | Percent Yield Non-oxidizing conditions |
|---|---|---|
| $CH_3$ | >75 | >75 |
| $C_2H_5$ | >75 | >75 |
| $C_3H_5$ | >75 | >75 |
| $C_6H_{13}$ | <50 | >70 |
| $C_{10}H_{21}$ | <30 | >70 |
| $C_{12}H_{25}$ | <20 | >70 |
| $C_{14}F_{29}$ | <20 | >70 |

As can be observed from the above table, when the isomerization is carried out under normal conditions, the phosphinites which are "reactive," i.e., those containing methyl, ethyl and allyl ester groups, are prepared in relatively high yields (above about 75%). Under the same conditions, however, the yields for the other phosphinites capable of being isomerized, i.e., those containing hexyl, decyl, dodecyl, tetradecyl ester groups, are markedly low and progressively decrease as the number of carbon atoms in the ester group increase. However, when the isomerization is conducted under non-oxidizing conditions, the yields of the immediately foregoing phosphine oxides are significantly improved, in fact, they are improved to the extent that the yields are relatively high (above about 70%). As can be appreciated, this dramatically illustrates the ability to improve the yields of the phosphine oxides prepared by the isomerization of such phosphinites by practicing the teachings of the present invention.

The phosphinities may be prepared by various known methods which include reacting monohalide phosphines with alcohol in the presence of a base, reacting monohalide phosphines with an alkali metal alcoholate and reacting dichlorophosphite with a Grignard reagent.

A particularly valuable group of phosphine oxides which are useful as synthetic detergents in aqueous systems and whose yields can be significantly improved over their preparation by normal isomerization by following the teachings of the instant invention are the unsymmetrical aliphatic tertiary phosphine oxides of the general formula $R_1R_2R_3PO$ prepared from the phosphinites according to the general Equation 1, wherein $R_1$ and $R_2$ are lower aliphatic groups containing from 1 to about 4 carbon atoms, and $R_3$ is a higher aliphatic group containing from about 5 carbon atoms to about 20 carbon atoms. Illustrative of such phosphine oxides are the following compounds:

dimethyl-n-hexyl phosphine oxide
dimethyl-n-octyl phosphine oxide
dimethyl-n-dodecyl phosphine oxide
dimethyl-n-decyl phosphine oxide
methyl ethyl n-dodecyl phosphine oxide
di-n-propyl-n-dodecyl phosphine oxide
di-n-butyl-n-dodecyl phosphine oxide
dimethyl-n-octadecyl phosphine oxide
diethyl-n-hexadecyl phosphine oxide
dimethyl-oleyl phosphine oxide
di-n-butyl-n-hexyl phosphine oxide
di-n-propyl-n-hexyl phosphine oxide Also obtained in improved yields by the present process are, for example, phosphine oxides prepared by the isomerization of phosphinites according to the foregoing Equation 1, wherein $R_3$ is an:

(1) ALIPHATIC GROUP

| $R_1$ | $R_2$ | $R_3$ |
|---|---|---|
| p-carboxy phenyl | p-carboxyphenyl | hexyl |
| isopropyl amino | isopropyl amino | hexyl |
| p-tolyl | p-tolyl | hexyl |
| m-nitro phenyl | m-nitro phenyl | hexyl |
| phenyl | phenyl | octyl |
| cyclohexyl | cyclohexyl | pentyl |
| cyclohexyl | cyclohexyl | dodecyl |
| 4-nitrophenyl | 4-nitrophenyl | dodecyl |
| hydroxyhexyl | hydroxyhexyl | hydroxyhexyl |
| 4-ethylphenyl | 4-ethylphenyl | hexyl |
| 1-naphthyl | 1-naphthyl | octyl |
| hexyl | hexyl | hexyl |
| octyl | octyl | octyl |
| decyl | decyl | decyl |
| 2-pyrryl | 2-pyrryl | dodecyl |
| 2-pyridyl | 2-pyridyl | dodecyl |
| 3-indolyl | 3-indolyl | dodecyl |
| 2-morpholyl | 2-morpholyl | dodecyl |
| 2-methyl-3-indolyl | 2-methyl-3-indolyl | dodecyl |
| 2-pyridyl | 2-pyridyl | tetradecyl |
| 2-pyrryl | 2-pyrryl | tetradecyl |
| 3-indolyl | 3-indolyl | tetradecyl |
| 2-morpholyl | 2-morpholyl | tetradecyl |
| 2-methyl-3-indolyl | 2-methyl-3-indolyl | tetradecyl |
| phenylvinyl | phenylvinyl | octyl |
| phenylvinyl | phenylvinyl | decyl |
| phenyl | phenyl | pentene-1 |
| phenyl | phenyl | 2-methyl-butene-1 |
| phenyl | phenyl | 3-methyl-butene-1 |
| ethyl | ethyl | hexene-1 |
| hydroxy phenyl | hydroxy phenyl | hexene-1 |
| methoxy phenyl | methoxy phenyl | hexene-1 |
| butyl | butyl | octene-1 |
| amino phenyl | amino phenyl | heptene-1 |
| cyclohexyl | cyclohexyl | 2,3-dimethyl butadiene-1,3 |
| cyclopentyl | cyclopentyl | pentene-1 |
| 4-nitrophenyl | 4-nitrophenyl | pentadiene-1,4 |
| p-tolyl | p-tolyl | 1-pentyne |
| 2-pyrryl | 2-pyrryl | 3-butyne-1-ol |
| 3-indolyl | 3-indolyl | hexadiene-1,5 |
| 2-methyl-3-indol | 2-methyl-3-indol | hexyne-2 |

(2) ALKARYL GROUP

| $R_1$ | $R_2$ | $R_3$ |
|---|---|---|
| phenyl | phenyl | ethylbenzene |
| p-tolyl | p-tolyl | n-propyl benzene |
| 2-methoxy benzyl | 2-methoxy benzyl | 2-methoxy benzyl |
| 3-nitro-p-tolyl | 1-nitro-p-tolyl | 3-nitro-p-ethyl benzene |
| methyl | methyl | p-cymene |
| ethyl | ethyl | allyl benzene |
| 1-naphthyl | 1-naphthyl | ethyl benzene |
| cyclohexyl | cyclohexyl | ethyl benzene |
| cyclopentyl | cyclopentyl | ethyl benzene |
| benzyl | benzyl | n-propyl benzene |
| 2-pyrryl | 2-pyrryl | ethyl benzene |
| 3-indolyl | 3-indolyl | ethyl benzene |
| 2-methyl-3-indolyl | 2-methyl-3-indolyl | ethyl benzene |
| 2-hydroxy benzyl | 2-hydroxy benzyl | 2-methoxy-4-allyl phenol |

(3) ALICYCLIC GROUP

| $R_1$ | $R_2$ | $R_3$ |
|---|---|---|
| 2-phenylcyclohexyl | 2-phenylcyclohexyl | 2-phenylcyclohexyl |
| methyl | methyl | cyclohexyl |
| cyclohexyl | cyclohexyl | cyclohexyl |
| cyclopentyl | cyclopentyl | cyclopentyl |
| phenyl | phenyl | 1-phenylcyclopentyl |
| methyl | methyl | cyclopentenyl |
| ethyl | ethyl | cyclohexenyl |
| butyl | butyl | cyclopentyl |
| 2-pyrryl | 2-pyrryl | cyclohexyl |
| 3-indoyl | 3-indoyl | cyclopentyl |
| 2-methyl-3-indoyl | 2-methyl-3-indoyl | cyclopentyl |
| 4-nitrophenyl | 4-nitrophenyl | cyclohexenyl |
| 1-naphthyl | 1-naphthyl | cyclopentyl |
| 3-aminophenyl | 3-aminophenyl | cyclohexyl |
| p-tolyl | p-tolyl | cyclohexyl |
| p-tolyl | p-tolyl | cyclopentenyl |
| xylyl | xylyl | cyclohexyl |
| xylyl | xylyl | cyclopentyl |

In addition, the amino, amide, ether, ester, carboxy sulfonyl, sulfo and nitro substituted derivatives of the foregoing unsubstituted phosphine oxides may be prepared by the process of the instant invention.

The following examples are presented to illustrate the invention with parts by weight being used in the examples unless otherwise indicated.

Example I

A quantity of about 66 parts of dimethyl-chlorophosphine is slowly added to an ice cooled and well-stirred mixture of about 128.5 parts of dodecanol and about 69.5 parts triethylamine in about 700 parts of hexane in an atmosphere of purified dry nitrogen. After the reaction is substantially completed, the triethylamine hydrochloride is filtered off under an atmosphere of dry nitrogen and the hexane is distilled off. A quantity of about 1 part dodecyliodide and .05 parts iodine crystals are added and the reaction product heated in an atmosphere of purified dry nitrogen to about 150° C. at which the temperature rises to about 240° C. After cooling to room temperature, the unsymmetrical tertiary phosphine oxide, dimethyl dodecylphosphine oxide (melting point 84–85° C.), is crsytallized from a solution of tetrahydrofuran. Nuclear magnetic resonance analysis indicates about 90% of the phosphinite is converted to the phosphine oxide.

Example II

A quantity of about 47.5 parts of dibutyl bromophosphine is slowly added to an ice cooled and well stirred mixture of about 27.9 parts octyl alcohol and about 23.5 parts of triethylamine in about 700 parts of hexane in an atmosphere of dry nitrogen. After the reaction is substantially completed, the triethylamine hydrochloride is filtered off under an atmosphere of dry nitrogen and the hexane is distilled off. A quantity of about 1 part octyl iodide and about .05 part iodine crystals are added and the reaction product heated in an atmosphere of purified dry nitrogen to about 200° C. at which the temperature rises to about 250° C. After cooling to room temperature, the unsymmetrical tertiary phosphine oxide, dibutyl octylphosphine oxide crystallizes. Nuclear magnetic resonance analysis indicates about 80% of the total phosphinite phosphorus is converted to the phosphine oxide.

Example III

A quantity of about 47.5 parts of dibutyl bromo phosphine is slowly added to an ice cooled and well stirred mixture of about 57 parts octadecyl alcohol and about 23 parts of triethylamine in about 700 parts of hexane. After the reaction is substantially completed, the triethylamine hydrochloride is filtered off under an atmosphere of dry nitrogen and the hexane is distilled off. A quantity of about 1 part octadecyl iodide and about .05 part iodine crystals are added and the reaction product heated in an atmosphere of purified dry nitrogen to about 200° C. at which the temperature rises to about 250° C. After cooling to room temperature, the unsymmetrical phosphine oxide, dibutyl octadecyl phosphine oxide crystallizes. Nuclear magnetic resonance analysis indicates about 85% of the phosphinite is converted to the phosphine oxide.

Although the present invention has been described with a great deal of particularity and specificity and due to the fact that many modifications or variations are possible under the inventive concepts as outlined hereinabove, this invention is intended to be limited only by the claims appended hereto.

What is claimed is:

1. In the method for preparing tertiary phosphine oxides wherein a phosphinite of the following formula

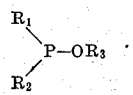

wherein $R_1$ and $R_2$ are selected from the group consisting of substituted and unsubstituted aliphatic hydrocarbon groups, substituted and unsubstituted aryl groups, substituted and unsubstituted alkaryl groups, substituted and unsubstituted aralkyl groups, substituted and unsubstituted alicyclic groups, and substituted and unsubstituted heterocyclic groups, and $R_3$ is selected from the class consisting of substituted and unsubstituted aliphatic hydrocarbon groups and substituted and unsubstituted alicyclic groups containing 5 or more carbon atoms, and substituted and unsubstituted alkaryl groups containing 8 or more carbon atoms, and wherein the substituents of said substituted groups are selected from the class consisting of hydroxy groups, amino groups, amide groups, ether groups, ester groups, carboxy groups, sulfonyl groups, sulfo groups and nitro groups; is isomerized to the corresponding oxide, the improvement comprising carrying out said isomerization under non-oxidizing conditions whereby the yield of said oxide is improved.

2. The method of claim 1 wherein said isomerization is carried out in the presence of a halide catalyst.

3. The method of claim 1 wherein said isomerization is carried out in the presence of an organic halide compound wherein the organic group of said compound is the same as the organic group of said phosphinite represented by $R_3$.

4. The method of claim 1 wherein said non-oxidizing conditions are maintained in the reaction zone by the presence of non-oxidizing gases.

5. In the method for preparing unsymmetrical teritary aliphatic phosphine oxides whrein a phosphinite of the following formula

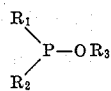

wherein $R_1$ and $R$ are lower aliphatic hydrocarbon groups containing from 1 to about 4 carbon atoms, and $R_3$ is a higher aliphatic hydrocarbon group containing from about 6 carbon atoms to about 20 carbon atoms, is isomerized to the corresponding oxide, the improvement comprising carrying out said isomerization under non-oxidizing conditions whereby the yield of said oxide is improved.

6. The method of claim 5 wherein said isomerization is carried out in the presence of a halide catalyst.

7. The method of claim 5 wherein said isomerization is carried out in the presence of an organic halide compound with the organic radical of said compound being the same as the group represented by $R_3$ of said phosphinite.

8. The method of claim 5 wherein said non-oxidizing conditions are maintained in the reaction zone by the presence of non-oxidizing gases.

9. In the method for preparing dimethyl dodecyl phosphine oxide, wherein dimethyl dodecyl phosphinite is isomerized to said oxide, the improvement comprising carrying out said isomerization in an atmosphere of dry nitrogen whereby the yield of said oxide is improved.

10. In a method for preparing dibutyl octyl phosphine oxide, wherein dibutyl octyl phosphinite is isomerized to said oxide, the improvement comprising carrying out said isomerization in an atmosphere of dry nitrogen whereby the yield of said oxide is improved.

11. In a method for preparing dibutyl octa-decyl phosphine oxide, wherein dibutyl octyl phosphinite is isomerized to said oxide, the improvement comprising carrying out said isomerization in an atmosphere of dry nitrogen whereby the yield of said oxide is improved.

12. A method for preparing dimethyl dodecyl phosphine oxide which comprises reacting dimethyl chlorophosphine and dodecanol in the presence of a tertiary amine base and an atmosphere of dry nitrogen, whereby dimethyl dodecyl phosphinite is formed, removing tertiary amine hydrochloride, adding dodecyliodide as a catalyst and heating said phosphinite in an atmosphere of dry nitrogen to about 150° C. to initiate the isomerization of said phosphinite to said oxide.

References Cited by the Examiner

UNITED STATES PATENTS 3,145,234  8/1964  Buckler et al. _____ 260—606.5

OTHER REFERENCES

Kosolapoff, Chemical Abstracts, 43 (1949), page 3801.
Kosolapoff, Chemical Abstracts, 48 (1954), page 7540.

TOBIAS E. LEVOW, *Primary Examiner.*

W. F. W. BELLAMY, *Assistant Examiner.*